United States Patent [19]
Togawa et al.

[11] Patent Number: 5,123,149
[45] Date of Patent: Jun. 23, 1992

[54] TURRET TOOL POST FOR MACHINE TOOL AND APPARATUS FOR CONTROLLING INDEXING OF THE SAME

[75] Inventors: Satoru Togawa, Tokyo; Mikio Kobayashi, Tsuchiura; Takanobu Sato; Takayuki Nagasawa, both of Ibaragi; Akira Koshio, Noda; Thuneo Orui, Abiko, all of Japan

[73] Assignee: Hitachi Seiko Co., Ltd., Chiba, Japan

[21] Appl. No.: 724,513

[22] Filed: Jun. 28, 1991

Related U.S. Application Data

[63] Continuation of Ser. No. 302,897, Jan. 30, 1989, abandoned.

[30] Foreign Application Priority Data

Feb. 1, 1988 [JP] Japan .................. 63-19541

[51] Int. Cl.$^5$ .............................................. B23B 3/16
[52] U.S. Cl. ............................. 29/48.5 R; 408/35; 408/710; 408/241 G; 409/134; 82/159; 29/DIG. 56; 74/612
[58] Field of Search ........... 29/48.5 A, DIG. 56; 82/159; 409/134, 211, 80; 408/35, 3, 710, 241 G; 74/813 L, 813 C, 613, 612

[56] References Cited

U.S. PATENT DOCUMENTS

| | | | |
|---|---|---|---|
| 618,951 | 2/1899 | Clyne | 29/48.5 R X |
| 3,850,059 | 11/1974 | Woltjen et al. | 74/813 C X |
| 4,507,993 | 4/1985 | Silverman et al. | 29/48.5 R X |
| 4,635,507 | 1/1987 | Kojima | 74/813 C |

FOREIGN PATENT DOCUMENTS

| | | | |
|---|---|---|---|
| 94950 | 6/1983 | Japan | 29/485 P |
| 47143 | 3/1984 | Japan | 74/813 C |
| 44248 | 3/1985 | Japan | 74/813 R |
| 19349 | 1/1987 | Japan | 74/813 R |
| 87105 | 3/1989 | Japan | 82/159 |
| 64-87136 | 3/1989 | Japan . | |
| 381835 | 10/1973 | U.S.S.R. | 74/813 R |
| 814649 | 3/1981 | U.S.S.R. | 74/813 R |

OTHER PUBLICATIONS

Exhibition Catalogs, first published Sep. 7, 1988, trade show, Chicago, Ill.
Exhibition Catalogs, first published Oct. 21, 1988, trade show, Tokyo, Japan.

*Primary Examiner*—Larry I. Schwartz
*Assistant Examiner*—Robert Schultz
*Attorney, Agent, or Firm*—Armstrong, Nikaido, Marmelstein, Kubovcik & Murray

[57] ABSTRACT

A turret tool post for a machine tool has a turret having a plurality of turret faces each equipped with a tool for machining, a turret shaft for rotating the turret, a cam follower provided on the turret shaft, a cam having a cam surface engaged with the cam follower to cause the cam follower to rotate, and an indexing motor for driving the cam to index the turret faces. A straight raceway portion is formed on the cam surface of the cam so that the cam follower is not driven to rotate through a predetermined angle. Also disclosed is an apparatus for controlling indexing of the turret tool post which has a turret controller for controlling the rotation of the indexing motor. The speed of the indexing motor is controlled in accordance with whether a door attached to a cover covering the turret and other elements is open or closed.

2 Claims, 8 Drawing Sheets

TURRET TOOL POST FOR MACHINE TOOL AND APPARATUS FOR CONTROLLING INDEXING OF THE SAME

This application is a continuation of application Ser. No. 302,897, filed Jan. 30, 1989, and now abandoned.

BACKGROUND OF THE INVENTION

The present invention relates to a turret tool post for a machine tool and an apparatus for controlling indexing of the same. More particularly, the present invention pertains to a turret tool post designed to enable ultra-high speed indexing and an apparatus for controlling the indexing process conducted by the turret tool post.

In the case of using a plurality of tools on a machine tool, it is common practice to use a turret tool post for indexing various tools successively, thereby efficiently conducting various kinds of machining operation without the need to change tools for each particular machining operation. More specifically, machining operations, for examples, turning, face milling, drilling, boring and threading, are efficiently carried out by successively indexing the required tools. There are known a variety of turret tool posts which may be classified into the following types: square turrets, hexagon turrets, flat turrets and drum-shaped turrets. If the indexing speed of a turret tool post is slow, the actual cutting time is shortened, which results in lowering of the cutting efficiency.

On the other hand, curvic coupling mechanism and knock pin mechanism wherein positioning is effected by insertion of a knock pin are known as indexing and positioning mechanisms for use in turret tool posts. Japanese Utility Model Unexamined Publication (Kokai) No. 62-95804 (1987) discloses a turret tool post for use in a machine tool or the like as being an intermittent indexing apparatus, which has a globoidal cam and a plurality of cam followers which are radially mounted on the peripheral surface of a shaft in such a manner as to be in engagement with the globoidal cam so that the cam followers are intermittently rotated to index and set a desired tool at a desired position.

The above-described conventional indexing and positioning mechanisms for a turret tool post need two operations, that is, an indexing operation and a clamping operation. The clamping operation is conducted in such a manner that, after the turret tool post has been rotated so as to reach a desired position, it is fixed in this position by oil-hydraulic or other similar driving means. Thus, there has heretofore been restriction on achievement of a reduction in the time needed for the indexing of the turret tool post that involves the above-described two operations.

The turret tool post that is disclosed in Japanese Utility Model Unexamined Publication (Kokai) No. 62-95804 (1987) set forth above does not need the above-described two operations. However, this turret tool post cannot provide discrete angles with a high degree of accuracy in indexing process unless both the cam shaft and the cam follower shaft are precisely positioned relative to each other. It is necessary in order to precisely provide a desired angle in indexing process to employ an apparatus for controlling the indexing process. Such a control apparatus is complicated as well as expensive. In addition, since there has recently been a demand for a high degree of positioning accuracy, it has heretofore been impossible to increase the indexing speed unconditionally.

Meanwhile, the body of a machine tool such as a lathe is covered with a machine cover for the reasons of design, safety and prevention of splash of cutting oil. The operator opens a door attached to the machine cover to replace a workpiece with another or change tools on the turret tool post. Accordingly, if the indexing speed of the turret tool post is increased, the operator is in danger when conducting an operation with the door of the machine cover kept open for effecting a setup or the like.

SUMMARY OF THE INVENTION

In view of the above-described circumstances, it is an object of the present invention to provide a turret tool post for a machine tool which is designed so that a necessary turret face is made available simply by effecting indexing without the need to conduct a clamping operation.

It is another object of the present invention to provide an indexing mechanism for use in a turret tool post of a machine tool which is capable of effecting a high-speed indexing operation.

It is still another object of the present invention to provide an apparatus for controlling indexing of a turret tool post of a machine tool which is suitable for an indexing mechanism which enables a necessary turret face to be made available simply by effecting indexing without the need to conduct a clamping operation.

It is a further object of the present invention to provide an indexing mechanism for use in a turret tool post of a machine tool which is capable of optimal control so that a high-speed indexing operation can be performed.

It is a still further object of the present invention to provide an indexing control apparatus for a turret tool post which is designed so that the operation of opening and closing a door attached to a cover that covers a machine tool is electrically interlocked with the indexing operation of the turret tool post.

To these ends, the present invention provides a turret tool post for a machine tool having a turret having a plurality of turret faces each equipped with a tool for machining, a turret shaft for rotating the turret, a cam follower provided on the turret shaft, a cam having a cam surface engaged with the cam follower to cause the cam follower to rotate, and an indexing motor for driving the cam to index the turret faces, wherein the improvement comprises a straight raceway portion formed on the cam surface of the cam so that the cam follower is not driven to rotate through a predetermined angle.

According to another of its aspects, the present invention provides an apparatus for controlling indexing of the turret tool post for a machine tool set forth above, the control apparatus comprising a sensor for detecting an angle which is provided on the cam, and a controller in which a time constant is set so that the cam comes to rest when the cam follower is in engagement with the straight portion in response to a signal output from the sensor.

It is even more effective if the sensor comprises a stop confirmation sensor for detecting an angle of the cam and a stop command sensor for delivering a stop command signal to the indexing motor.

According to another of its aspects, the present invention provides, in a machine tool having a turret having a plurality of turret faces, an indexing motor for rotating the turret to index the turret faces, a turret controller for controlling the rotation of the indexing motor, and a door attached to a cover covering the turret and other elements, an apparatus for controlling indexing of the turret comprising the turret controller which has means for detecting whether the door is open or closed, and means for instructing, in response to a signal from the detecting means which represents the fact that the door is open, the indexing motor to rotate at a lower speed than in the case of an indexing operation conducted during normal machining process.

Thus, since the turret tool post according to the present invention need not have a clamp mechanism nor a speed change mechanism, it is possible to effect considerably high-speed indexing with a relatively simple structure.

In addition, since the indexing speed of the turret tool post is lowered in interlocking relation to the door of the machine cover, the operator can conduct a setup operation with safety. As a result, the operating efficiency is enhanced.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements and, of which.

DETAILED DESCRIPTION OF THE PREFERRED EMBODIMENTS

Embodiments of the present invention will be described hereinunder in detail with reference to the accompanying drawings.

Figure 1:
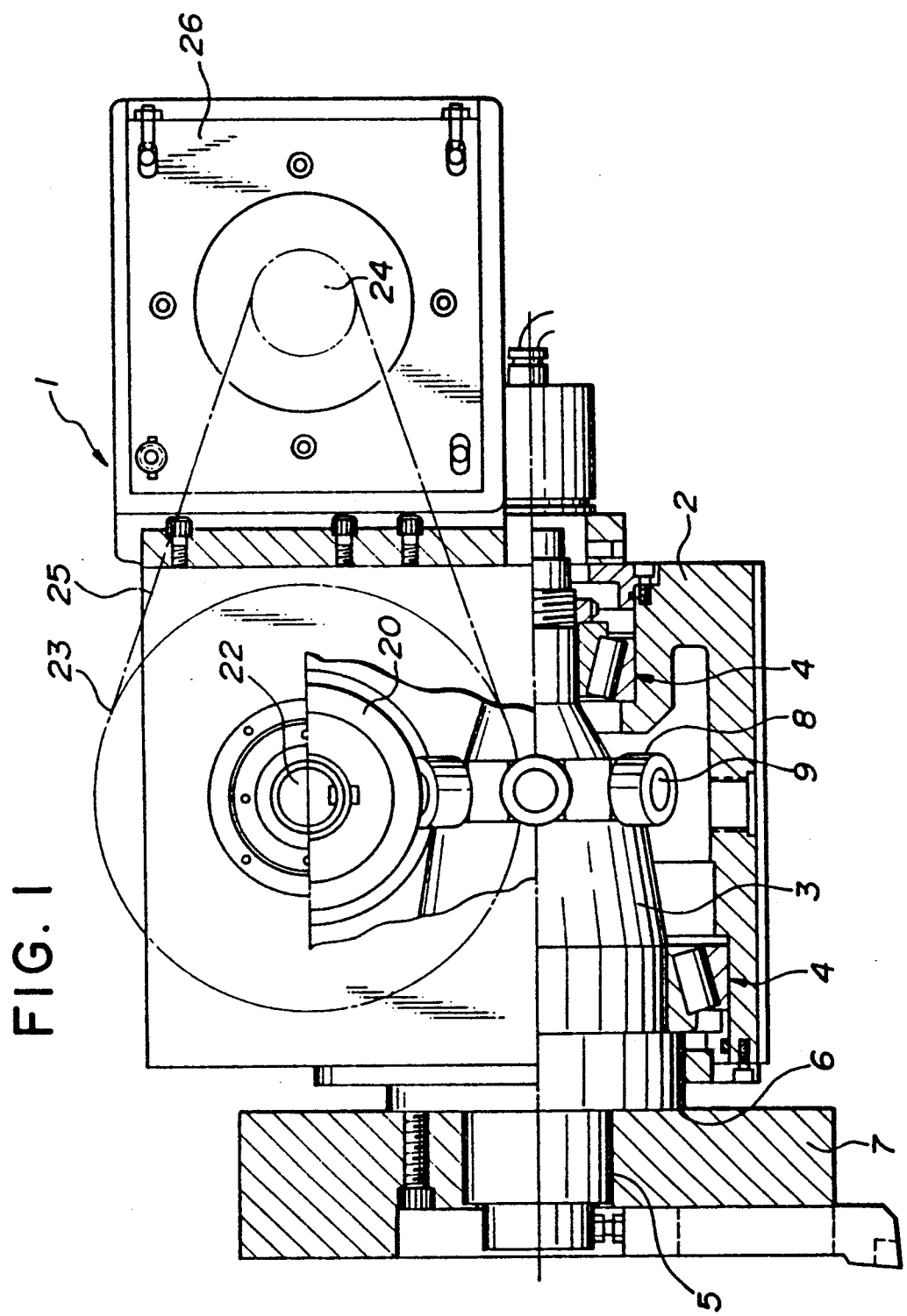
FIG. 1 is a partially sectional view of one embodiment of the turret tool post according to the present invention.

Referring first to FIG. 1, which is a partially sectional view of a turret tool post 1 according to the present invention, a turret body 2 is in the shape of a box which has a space therein. The turret body 2 is formed from a cast material. The turret body 2 is mounted on a carriage (not shown). In machining process, the carriage, together with the turret body 2, is moved to effect machining with a tool provided on a turret 7. A turret shaft 3 is accommodated inside the turret body 2. The turret shaft 3 is rotatably supported at both ends thereof by bearings 4 which receive force acting in the thrust direction.

A flange face 6 is provided at one end of the turret shaft 3. An output shaft 5 projects from the flange face 6. The turret 7 is secured on the output shaft 5 and in close contact with the flange face 6. That portion of the turret shaft 3 which extends between the bearings 4 is provided with a plurality of cam followers 8 in such a manner that the central axis of each cam follower 8 extends perpendicular to the axis of the turret shaft 3. Each cam follower 8 is rotatably provided on a cam follower shaft 9 through a bearing or other similar means. The cam follower shaft 9 is rigidly secured to the turret shaft 3.

Figure 2:
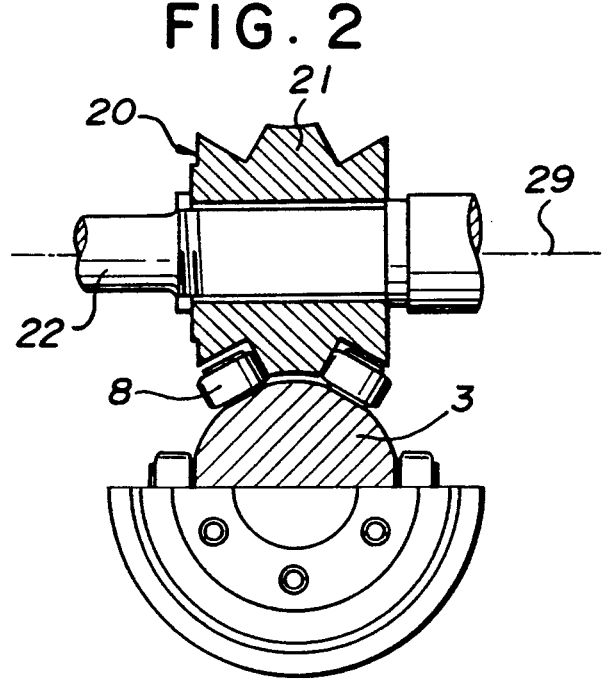
FIG. 2 is a side view showing the roller gear cam and the cam followers of the turret tool post shown in FIG. 1.
Figure 3:
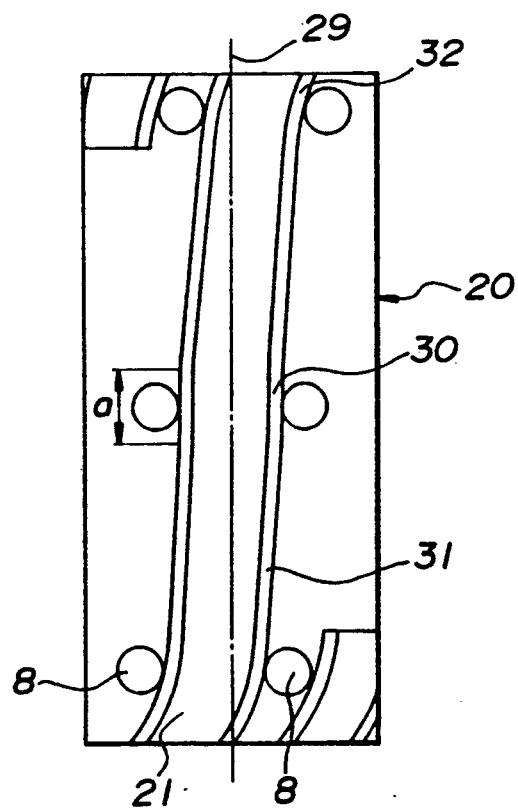
FIG. 3 is a development view of the roller gear cam.

Thus, a plurality of combinations of a cam follower 8 and a cam follower shaft 9 are disposed around the outer periphery of the turret shaft 3 at equal spacings. On the other hand, a roller gear cam 20 has a spiral projection 21 formed on the outer periphery thereof, the projection 21 having a trapezoidal cross-section (see FIG. 2). The projection 21 is in engagement with cam followers 8. The roller gear cam 20 rotates about the axis 29 of shaft 22. FIG. 3 is a development view showing the roller gear cam 20. The turret shaft 3 is rotated through engagement between the projection 21 and a pair of cam followers 8 which sandwich the projection 21 therebetween.

The projection 21 formed on the roller gear cam 20 comprises a slope portion 31, a straight portion 30 and a steep slope portion 32. Each of the slope and steep slope portions 31 and 32 spirals at a predetermined pitch along the axis of the roller gear cam 20. The straight portion 30 of the projection 21, which extends through the distance a, has no pitch angle. The straight portion 30 has the advantage that, even if the accuracy of angular positioning of the roller gear cam 20 is somewhat low, there is no adverse effect on the angular position at which the turret shaft 3 is suspended. Positioning of the turret shaft 3 in indexing process is effected using the straight portion 30.

Provision of the straight portion 30 enables the speed of rotation of the roller gear cam 20 to be increased to the maximum level of the driving capacity of a motor 26 for indexing. The shaft 22 has a timing belt pulley 23 rigidly secured thereto, the pulley 23 having teeth formed on the outer periphery thereof at a predetermined pitch. A timing belt 25 is engaged with the timing belt pulley 23. The other end of the loop of the timing belt 25 is engaged with another timing belt pulley 24 which is directly coupled to the indexing motor 26 so as to be driven by it.

Figure 4A:
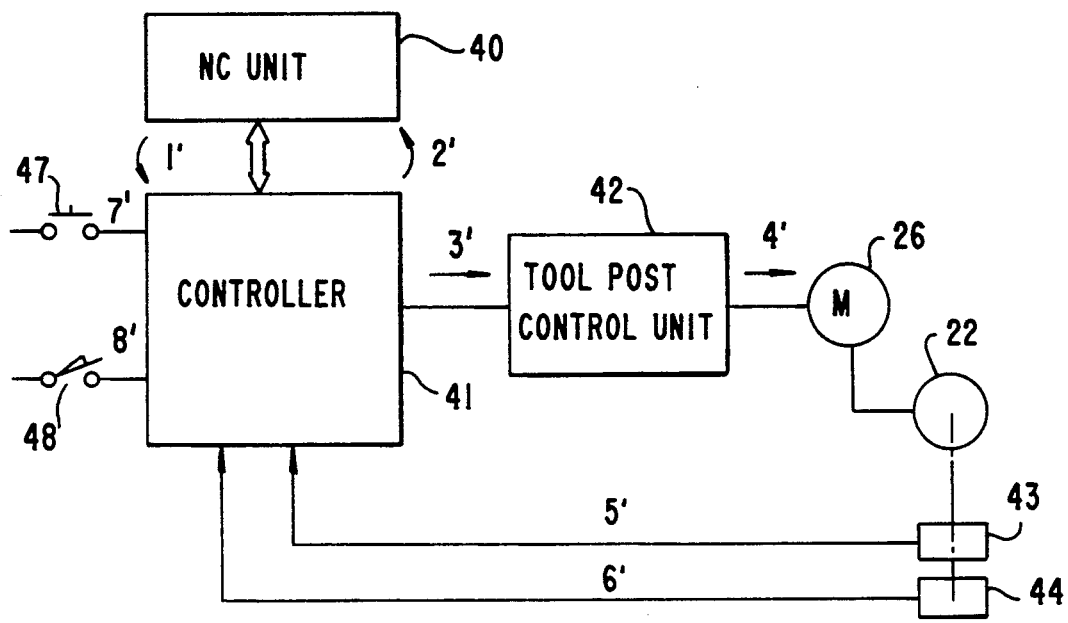
FIGS. 4(a) and 4(b) are block diagrams showing one embodiment of the indexing control apparatus according to the present invention.

FIG. 4(a) is a functional block diagram of the turret tool post 1. An NC unit 40 is a known numerical control unit. When a T code command, which is a command given to effect indexing of the turret tool post 1, is issued from the NC unit 40, this command is transmitted to a controller 41 (signal 1'). In response to the T code command, the controller 41 issues a tool post control unit 42 with commands such as a forward/reverse command and a start command (signal 3'). The tool post control unit 42 outputs electric power to the indexing motor 26 to drive it (signal 4').

Figure 5:
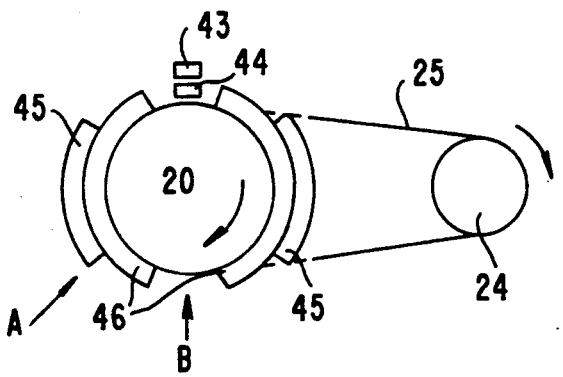
FIG. 5 shows a mechanism for detecting an angle of the roller gear cam.

The rotation of the indexing motor 26 is transmitted to the turret shaft 3 to index the turret 7. Dogs 45 and 46 are provided around the outer periphery of the roller gear cam 20 (see FIG. 5). The dogs 45 are provided for detection so that a switch (described below) issues a stop command to the indexing motor 26. The dogs 46 are provided to confirm that the turret 7 of the turret tool post 1 is in a given indexed position. For this purpose, a stop command LS 43 and a stop confirmation LS 44 are provided on the turret body 2 in correspondence with the dogs 45 and 46, respectively, so that the LS 43 and 44 are activated in accordance with whether or not a turret face of the turret 7 has been indexed as detected by dogs 45, 46.

The stop command LS 43 is disposed at a position corresponding to a position where a turret face is indexed. When activated, the stop command LS 43 delivers a signal 5' to the controller 41. In response to this signal, the controller 41 delivers a command signal 3' to the tool post control unit 42. The stop confirmation LS 44 is disposed at a position where it is possible to confirm that the turret 7 has been indexed to a predetermined position at a predetermined angle. When activated, the stop confirmation LS 44 delivers a signal 6' to the controller 41. In response to the signal 6', the controller 41 starts counting with an up/down counter to know which turret face (hereinafter referred to as simply "face") of the turret 7 is presently indexed.

In addition, it is checked with the stop confirmation LS 44 whether or not there is an indexing mistake when the turret 7 is suspended to index a particular face. It should be noted that, if it is impossible to confirm that the door of the machine cover is closed, as described later, the signal 5' is ignored and the command signal 3' is also controlled on the basis of the signal 6' from the stop confirmation LS 44. Since the stop command LS 43 and the stop confirmation LS 44 are arranged to detect an angular position in cooperation with the dogs 45 and 46 which are provided on the roller gear cam 20, the range of rotation is relatively wide, so that it is possible to effect accurate positioning even if the arrangement is somewhat rough.

A turret index switch (start button) 47 is used when the controller 41 is set in the manual operation mode. When the turret index switch 47 is pressed in the manual operation mode, a signal 7' is delivered therefrom to the controller 41. In response to the signal 7', the controller 41 delivers a signal 3' to the tool post control unit 42 to cause the indexing motor 26 to rotate. A door position confirmation LS 48 is provided to detect whether or not a door 62 (described later) is closed. The controller 41, when in the manual operation mode, receives a signal 8' from the door position confirmation LS 48 and delivers a signal 3' to control the indexing motor 26 such that the motor 26 is decelerated or rotated at a speed in the steady state, as described later.

Figure 4B:
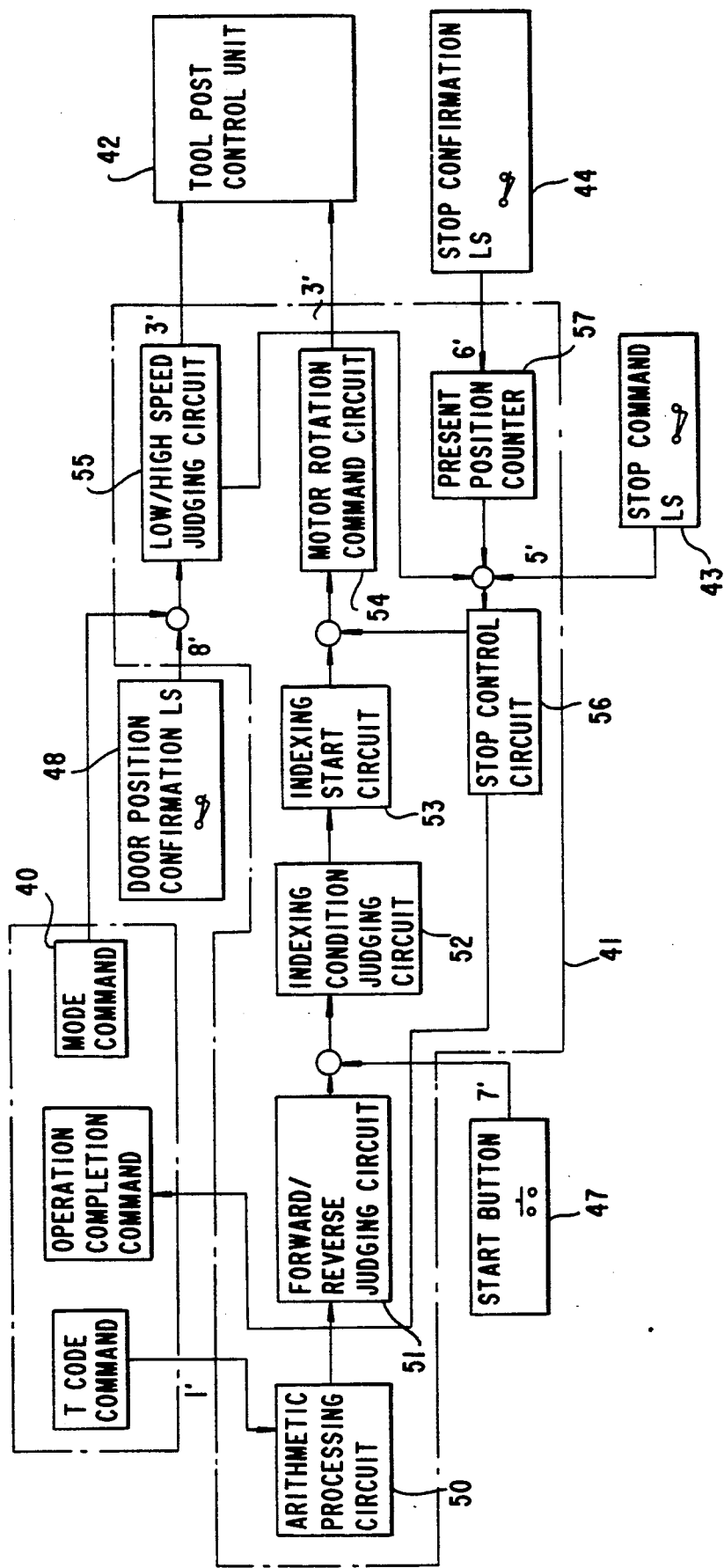

FIG. 4(b) is a functional block diagram schematically showing the arrangement of the controller 41. When the T code command 1' is issued from the NC unit 40, the command 1' is subjected to arithmetic processing in an arithmetic processing circuit 50. Then, it is determines in a forward/reverse judging circuit 51 whether the indexing motor 26 is to be rotated forward or backward to reach a desired turret face through the shorter distance. An indexing condition judging circuit 52 determines with a sensor (not shown) or the like whether or not there is an obstruction to the rotation of the turret. More specifically, the circuit 52 determines whether or not mechanical conditions are appropriate, e.g., as to whether or not there is an obstruction to the rotation of the turret shaft 3. If the mechanical conditions are determined to be satisfactory, an indexing start circuit 53 is activated to give a command to a motor rotation command circuit 54.

In response to this command, the motor rotation command circuit 54 instructs the tool post control unit 42 to rotate the indexing motor 26 forward or backward. On the other hand, the door position confirmation LS 48 confirms that the door is closed and transmits a signal to a low/high speed judging circuit 55. The circuit 55 determines whether the indexing motor 26 for the turret tool post 1 is to be rotated at high or low speed. The judging circuit 55 is being supplied with a signal indicating that the apparatus is set in the manual or automatic operation mode from the NC unit 40. When the door is determined to be open in the manual operation mode, the indexing motor 26 is decelerated, as described later. The signal from the stop confirmation LS 44 is transmitted to a present position counter 57 to effect counting for making a determination as to which turret face is presently indexed. A stop control circuit 56 is supplied with signals delivered respectively from the low/high speed judging circuit 55, the present position counter 57 and the stop command LS 43 to control suspension of the indexing motor 26. When the operation instructed by the T code command is completed, the stop control circuit 56 delivers an operation completion signal to the NC unit 40.

Figure 6:
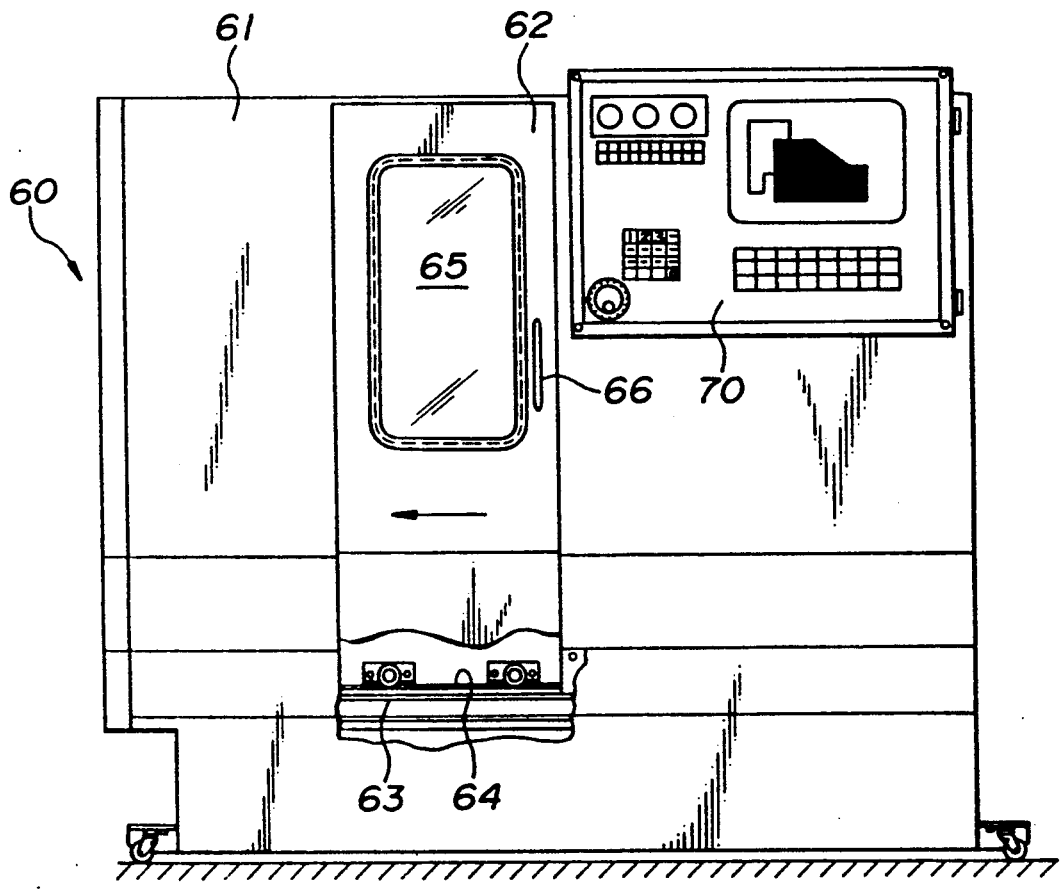
FIG. 6 is a front view showing a cover of an NC lathe.

FIG. 6 is a front view of an NC lathe 60. A machine cover 61 which covers the whole NC lathe 60 is made of a metallic plate material. In this example, the left-hand portion of the machine cover 61 (as viewed in the figure) mainly covers the spindle portion of the NC lathe 60, while the right-hand portion of the machine cover 61 mainly covers the turret tool post. A door 62 is provided in the substantially central portion of the machine cover 61 such that the door 62 can be opened and closed as desired. The door 62 is movable sideward as viewed in FIG. 6. When it is necessary to open the door 62, for example, when a workpiece is to be attached to or detached from a holding device of the lathe 60, the operator moves the door 62 leftward to thereby open it. The door 62 is normally kept closed when the machine tool is in operation.

Wheels 63 are rotatably attached to the lower end of the door 62. The wheels 63 roll on a rail 64 which is provided on the inner surface of the bottom of the machine cover 61. A rectangular window member 65 is attached to the upper part of the door 62 through a known fixing means such as a rubber packing. The window member 65 is made of a transparent synthetic resin material that is resistant to heated cuttings which may collide with it. A handle 66 is secured to one end of the door 62 so that the operator grips the handle 66 to open or close the door 62. The door position confirmation LS 48 is provided at an appropriate position on the door 62 to detect whether or not the door 62 is closed.

A control panel 70 of the NC unit 40 is secured to the right upper portion of the front side of the machine cover 61.

Operation Flow of Turret Tool Post

Figure 7:
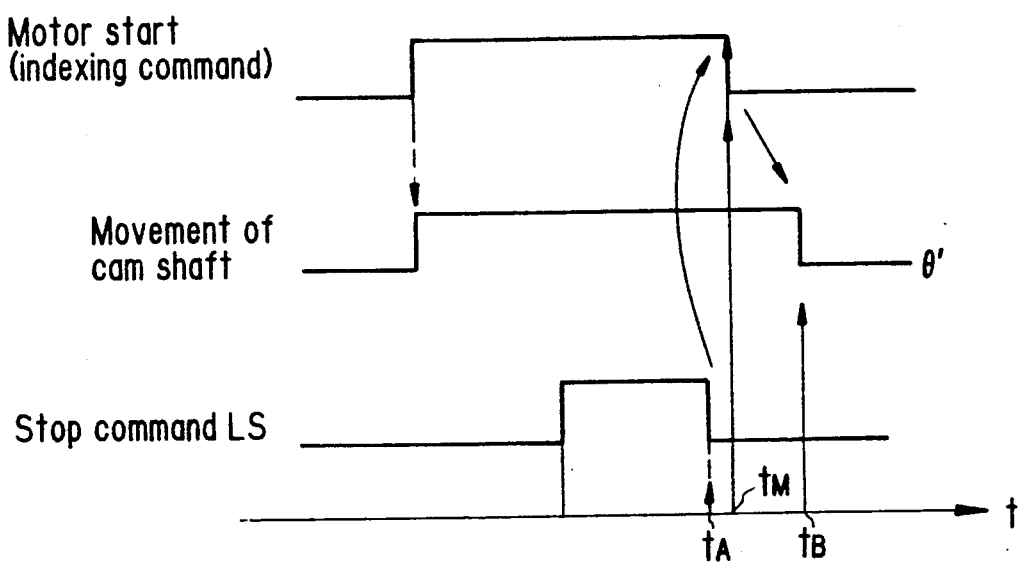
FIG. 7 is a time chart showing the operation of the indexing motor, the roller gear cam and the stop command LS.

FIG. 7 is a time chart showing the operation of the indexing motor 26, the roller gear cam 20 and the stop command LS 43. The indexing motor 26 and the roller gear cam 20, which are directly coupled together through the timing belt 25, are activated simultaneously. The reference symbol $t_M$ denotes the point of time at which the power supply to the indexing motor 26 is cut off. The reference symbol $t_B$ denotes the point of time at which the roller gear cam 20 comes to rest after the power supply to the motor 26 has been cut off. Normally, the roller gear cam 20 does not suspend immediately because of a delay determined by time constants involving the inertia acting on the rotor of the indexing motor 26 and the inertia acting on the roller gear cam 20. The point of time $t_A$ (i.e., point A of dog 45) at which the output of a stop command signal is started is coincident with the point of time at which the command from the stop command LS 43 terminates.

The time $|t_M - t_A|$ corresponds to a lag in processing from the instant a stop command is received until the power supply to the indexing motor 26 is cut off. The time $|t_B - t_M|$ is a period of time (determined by time constants) from the instant the power supply to the indexing motor 26 is cut off until the motor 26 has come to rest. When the time $|t_B - t_A|$ has elasped after the point A shown in FIG. 5 has passed the stop command LS 43, the roller gear cam 20 comes to rest at the point of time $t_B$. The arrangement is such that the roller gear cam 20 comes to rest when a pair of cam followers 8 are in contact with the straight portion 30 of the roller gear cam 20, as shown in FIG. 3. The mechanism should be designed so that the speed of rotation of the roller gear cam 20 is increased to the maximum level of the driving capacity of the indexing motor 26 by taking into consideration each of the above-described time constants through experiments or calculation.

Indexing Operation of Turret Tool Post 1

Figure 8:
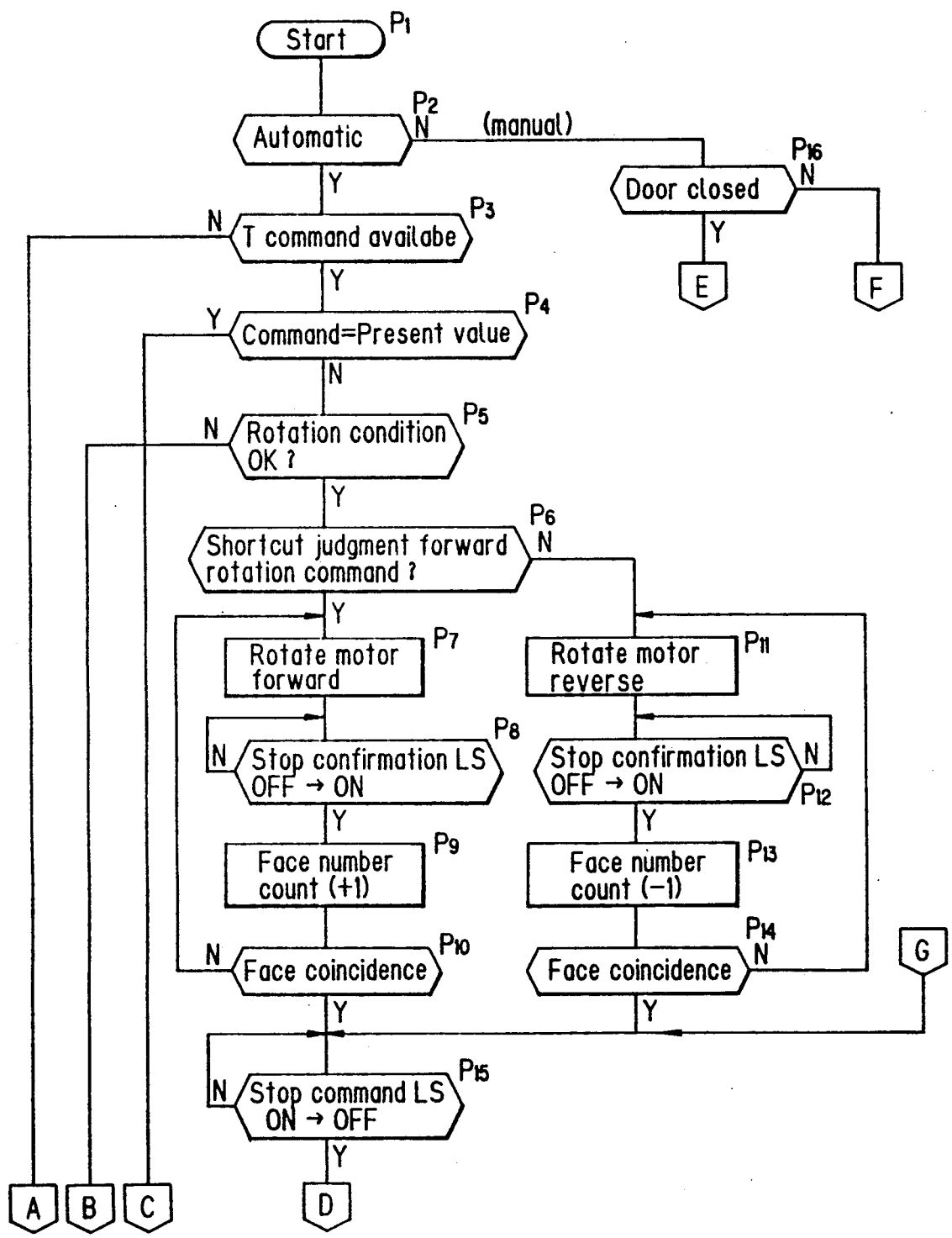
FIGS. 8 and 9 are flowcharts showing the operation of the turret tool post according to the present invention.
Figure 9:
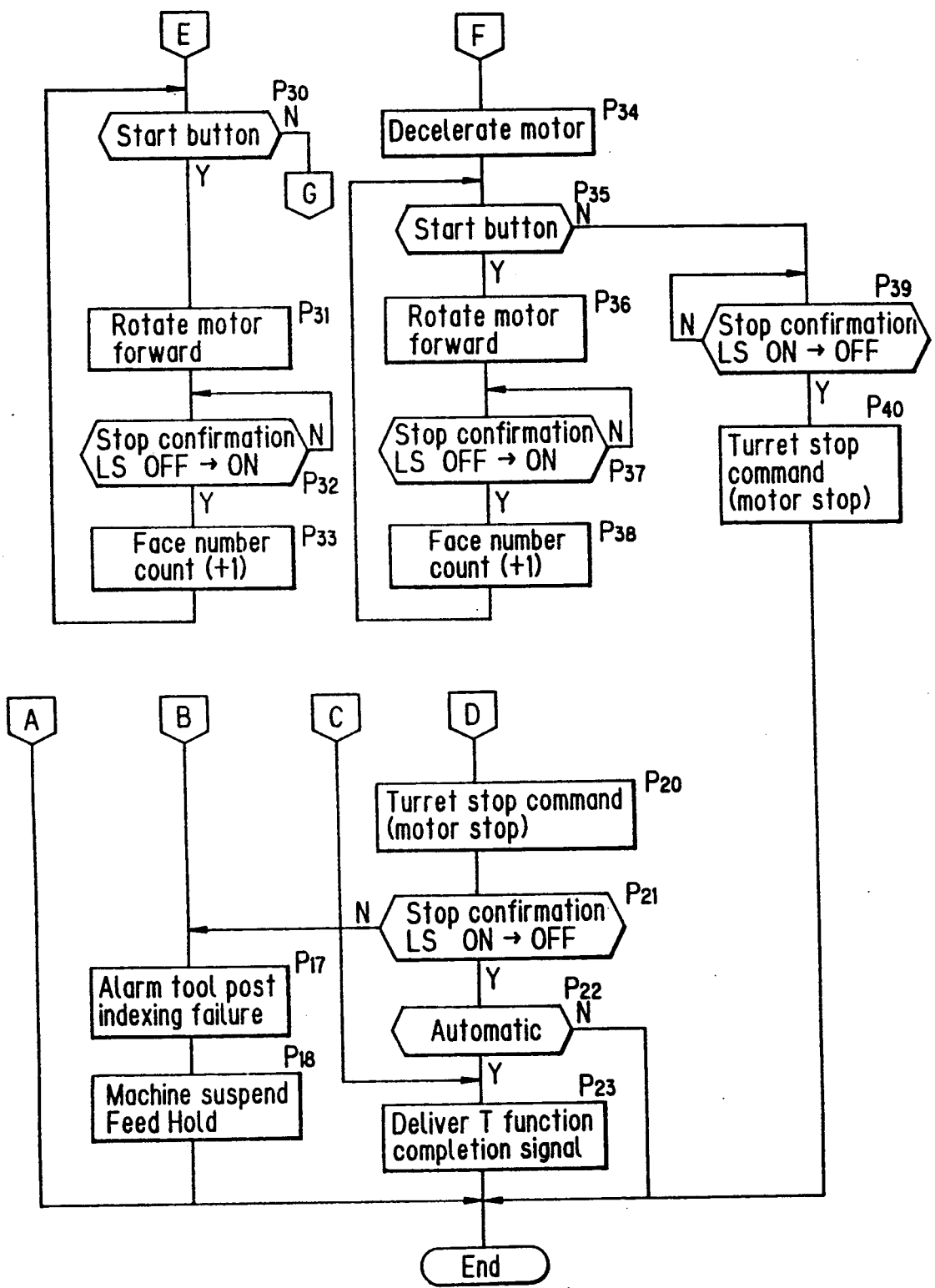

FIGS. 8 and 9 are flowcharts showing the operation of the turret tool post 1. The process is started in Step $P_1$. It is determined in Step $P_2$ whether or not the machine is set in the automatic operation mode. The process will be explained below in regard to the automatic cycle. It is determined in Step $P_3$ whether or not a T code command signal 1', that is, a command given to effect indexing of the turret tool post 1, has been issued from the NC unit 40. If NO, the process ends.

This end, however, does not mean suspension of the control operation, but the process returns to Step $P_1$ to repeat the sequence. If YES is the answer in Step $P_3$, the process proceeds to Step $P_4$ where it is determined whether or not the command is coincident with the present value, that is, whether or not a face which is instructed to be indexed is coincident with the presently indexed face. If YES, a T function completion signal (Step $P_{23}$) is delivered and then the process ends. If NO is the answer in Step $P_4$, the process proceeds to Step $P_5$ where it is determined whether or not the conditions for rotation of the indexing motor 26 are satisfactory. If NO, the process proceeds to Step $P_{17}$ where an alarm which indicates that there is a tool post indexing failure is given and then the machine is suspended (Step $P_{18}$).

If YES is the answer in Step $P_5$, the process proceeds to Step $P_6$ where it is determined whether or not the indexing motor 26 should be rotated forward to reach a commanded face through the shorter distance. If NO is the answer in Step $P_6$, the process proceeds to Step $P_{11}$ where the motor 26 is rotated backward. Next, the process proceeds to Step $P_{12}$ where it is determined whether or not the stop confirmation LS 44 is ON, that is, whether or not the turret has been indexed to a predetermined position at a predetermined angle. If YES, the face number is counted in Step $P_{13}$. It is determined in Step $P_{14}$ whether or not the presently indexed face is coincident with the desired face, that is, the face instructed to be indexed by the T code command. If NO is the answer in Step $P_{14}$, the process returns to Step $P_{11}$ and the sequence is repeated in the same way as the above until the face that is presently indexed is determined to be coincident with the desired one.

If YES is the answer in Step $P_6$, the process proceeds to Step $P_7$ where the indexing motor 26 is rotated forward, and the process then proceeds to Step $P_8$ where it is determined whether or not the stop confirmation LS 44 is ON. If NO, the indexing motor 26 is continued to rotate forward. If YES is the answer in Step $P_8$, the process proceeds to Step $P_9$ where the face number is counted, and the process then proceeds to Step $P_{10}$ where it is determined whether or not the face that is presently indexed is coincident with the desired one. If NO is the answer in Step $P_{10}$, the process returns to Step $P_7$ to repeat the above-described sequence until the face that is presently indexed is determined to be coincident with the desired one. When it is determined in Step $P_{10}$ or $P_{14}$ that the desired face has been indexed, the process proceeds to Step $P_{15}$ where it is determined whether the stop command LS 43 is ON or OFF.

If the stop command LS 43 is determined to be OFF, a turret stop command is issued to suspend the indexing motor 26 in Step $P_{20}$. It is then determined in Step $P_{21}$ whether the stop confirmation LS 44 is ON or OFF. If it is determined that the LS 44 is OFF, that is, the turret has been indexed to a predetermined position, the process proceeds to Step $P_{22}$. If NO is the answer in Step $P_{21}$, the process proceeds to Step $P_{17}$ where the machine gives an alarm and then comes to rest. If YES is the answer in Step $P_{21}$, the process proceeds to Step $P_{22}$ where it is determined whether or not the machine is set in the automatic operation mode. If YES, the process proceeds to Step $P_{23}$ where a T function completion signal is delivered and then the process ends. If NO is the answer in Step $P_{22}$, the process ends because the machine is set in the manual operation mode.

Control Operation Conducted When Door is Opened

If the door 62 is determined to be closed in Step $P_{16}$, it is then determined in Step $P_{30}$ whether or not the turret index switch 47 is ON. If YES, the controller 41 issues a command to the indexing motor 26 so that it is rotated forward (Step $P_{31}$). Next, when the stop confirmation LS 44 is activated (Step $P_{32}$), a stop confirmation signal is delivered to the controller 41.

If the door 62 is determined to be open in Step $P_{16}$, the flow F (see FIG. 9) is executed. More specifically, the indexing motor 26 is decelerated in Step $P_{34}$. When the turret index switch 47 is turned on (Step $P_{35}$), the indexing motor 26 starts to rotate forward (Step $P_{26}$). Next, it is determined whether the stop confirmation LS 44 is OFF or ON (Step $P_{37}$). If the LS 44 is determined to be ON, the count of the face number is incremented by one in Step $P_{38}$ because the rotation of the motor 26 is forward. As long as the turret index switch 47 is ON, the sequence from Step $P_{36}$ to Step $P_{38}$ is repeated.

During this period of time, the operator indexes each particular turret face equipped with a desired tool from necessity of, for example, setting up the turret tool post 1. Since the indexing operation is conducted at a lower speed than in the case of normal machining process by the command issued in Step $P_{34}$, the operator can conduct a setup operation with safety.

If the turret index switch 47 is not pressed any more, the process proceeds to Step $P_{39}$ where it is determined whether or not the stop confirmation LS 44 is OFF. If YES, it is determined that the desired turret face has been indexed and therefore the indexing motor 26 is suspended immediately (Step $P_{40}$). Then, the process ends.

Other Embodiments

Although in the foregoing the indexing mechanism employs a roller gear cam and cam followers, the present invention is not necessarily limitative thereto. It is also possible to employ any other similar cam mechanism which is arranged such that no looseness is produced between the cam and the cam followers, as described above. The door position confirmation LS 48 which is employed to confirm that the door 62 is closed may be replaced with other known detecting means such as photoelectric, magnetic or ultrasonic sensor means.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. In a machine tool having a turret tool post, said machine tool including a turret having a plurality of turret faces each equipped with a tool for machining, a turret shaft for rotating said turret, a cam follower provided on said turret shaft, a cam having a cam surface engaged with said cam follower to cause said cam following to rotate, an indexing motor for driving said cam to index said turret faces, a straight raceway portion formed on said cam surface of said cam so that said cam follower is not driven to rotate through a predetermined angle, an apparatus for controlling indexing of said turret tool post comprising:

first dogs provided on said cam for indicating a given indexed position;

second dogs provided on said cam for confirming that said turret faces of said turret tool post is in said given indexed position;

a stop confirmation sensor for detecting said first dogs;

a stop command sensor for detecting said second dogs and for delivering a stop command signal to said indexing motor; and a controller means for setting a lag time so that said cam comes to rest when said cam follower is in engagement with said straight raceway portion in response to said stop command signal from said stop command sensor means.

2. In a machine tool having a turret, said turret having a plurality of turret faces, an apparatus for controlling indexing of said turret comprising:

an indexing motor for rotating said turret to index said turret faces;

a turret controller for controlling the rotation of said indexing motor; and a door attached to a cover covering said turret and other element, said turret controller having a door detecting means for detecting whether said door is open or closed and for outputting a signal which indicates that said door is open, and high/low speed determining means for instructing, in response to said signal from said door detecting means, said indexing motor to rotate at a speed which is lower than a speed used to rotate said indexing motor during an indexing operation during a machining process.

* * * * *